United States Patent Office 3,728,206
Patented Apr. 17, 1973

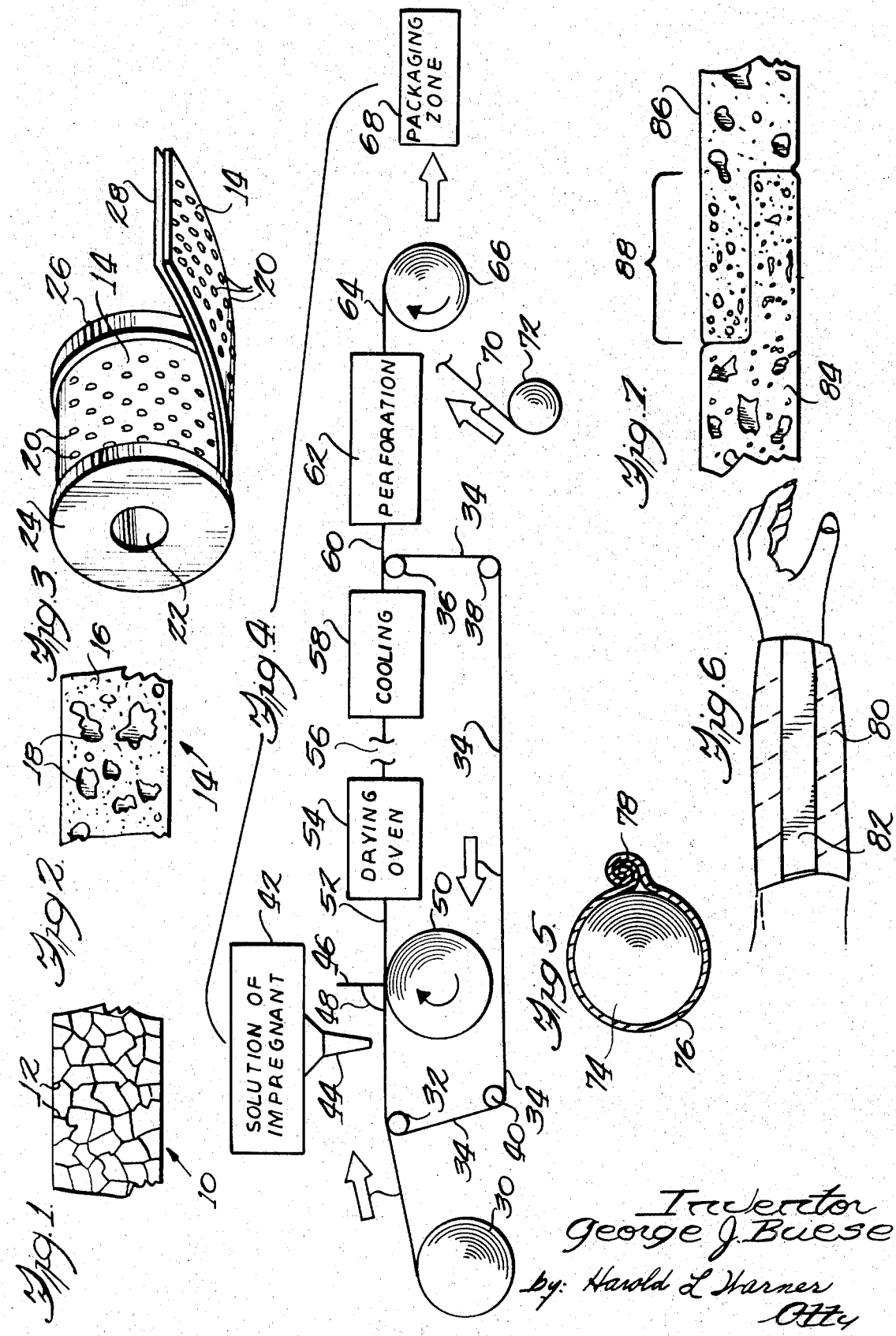

3,728,206
THERMOPLASTIC SUPPORTIVE STRUCTURE
George J. Buese, East Brunswick, N.J., assignor to
Johnson & Johnson
Filed Nov. 23, 1970, Ser. No. 92,096
Int. Cl. B32b 3/10, 3/26
U.S. Cl. 161—112                    10 Claims

ABSTRACT OF THE DISCLOSURE

This composite supportive structure comprises a web of open-cell, resilient non-thermoplastic foam, such as polyurethane foam, containing within the same a matrix of foam-like thermoplastic material, such as trans-1,4-polyisoprene, which is cohesive and sufficiently plastic at elevated temperatures to be readily moldable and yet crystallizable into a rigid structure at room temperature. The foam-like thermoplastic matrix is present in sufficient quantity and distributed throughout the cellular structure of the web so as to substantially impart its moldability and rigidity characteristics thereto. The composite foam-within-a-foam structure is advantageously employed, preferably in perforated form, as an orthopedic wrap which, upon heating, can be readily molded to an injured limb and thereafter allowed to crystallize and harden to form a smooth, rigid supportive and protective cast.

BACKGROUND OF THE INVENTION

Field of the invention

The present invention relates to thermoplastic supportive structures which can be readily molded after heating to elevated temperatures and thereafter crystallized at ambient temperature to form rigid supportive structures. More specificially, it relates to a composite sheet or bandage comprising an open-cell, resilient nonthermoplastic foam having distributed throughout a thermoplastic material in a cellular or foam-like form which is cohesive, conformable and moldable at elevated temperatures and will convert, shortly after cooling, to become substantially rigid at ordinary room temperature, said composite sheet or bandage being advantageously employed as a wrap to form orthopedic casts.

While the present invention is described herein with particular reference to orthopedic sheets and bandages for immobilizing portions of the body, it should be understood that the invention is not limited thereto. It can be used to form rigid supportive structures for a variety of uses, including non-medical uses, particularly where the supportive and yet thermoplastic nature of the composite structure can be advantageously employed, as will be apparent to those skilled in the art in the light of the presence disclosure.

Description of the prior art

To immobilize, support and protect injured or diseased limbs, a variety of supportive orthopedic structures are employed, the most common being prepared from plaster of Paris (usually with minor amounts of modifying ingredients) on a fabric or gauze base, i.e., the so-called "plaster cast." Such plaster of Paris cast materials are relatively inexpensive, convenient, and ready to use after simply dipping in water and are an orthopedic medium with which most physicians are familiar and have had considerable experience.

Notwithstanding, plaster of Paris has a number of well-recognized shortcomings, as enumerated, for example, in British Pat. 1,155,556. For example, the process of applying plaster of Paris is messy and subjects the underlying body member to undesired moisture and, on occasions, considerable heat due to the exothermic setting reaction of the plaster. Plaster of Paris casts are also undesirably heavy, and many are subject to damage by wetting and thus by washing with water. They also tend to interfere in the taking of X-ray pictures, and are difficult to reapply or reuse. They have only limited breathability and occasionally present allergenic problems.

There have been past efforts to find substitutes for plaster of Paris in orthopedic casts; and while these substitutes cope with a number of shortcomings in the latter they also exhibit one or more shortcomings of their own. For example, the technique disclosed in U.S. Pat. 3,027,336 involves the application of an acrylic resin and catalyst system in the form of a paste which is inconvenient to prepare, difficult to apply and otherwise suffers from a number of undesirable features. The technique of U.S. Pat. 3,089,486 involves the inconvenient and cumbersome impregnation of a methacrylate-polymer-imbued bandage with a liquid, curable methacrylate monomer component immediately before or after the bandage is placed on the body member.

Other approaches contemplate the use of thermoplastic sheets comprising, for example, trans-1,4-polyisoprene, as disclosed in Canadian Pat. 746,291 and British Pat. 1,155,556. These solid plastics are often difficult to cut and shape in the thicknesses normally used. When thinner sheets are used and are heated and stretched to conform to the underlying member they tend to thin out or narrow in cross section and often pull apart. This is even more evident when perforated thinner sheets or strips are used. The lack of resiliency and back-pull also result in poor conformability characteristics.

The aforementioned Canadian Pat. 746,291 and British Pat. 1,155,556 also contemplate the use of backing fabrics which have the desirable feature of limiting the stretch and obviating pull-apart but, in general, lack omnidirectional resiliency, with resulting reduction of conformability, and are often relatively costly. Because they do not readily lend themselves to thick cross sections, a large number of layers may be required to build up a cast of desired thickness. This is not only inconvenient and time-consuming, it may also result in premature cooling and poor layer-to-layer cohesion.

While not suitable for the production of orthopedic wraps or casts, a composite is disclosed in U.S. Pat. 3,061,460 comprising a non-thermoplastic foam, such as polyurethane foam, impregnated with a thermoplastic resin, such as polyvinyl chloride. It can be used to form "shaped components for the motor vehicle, shoe, clothing and upholstery industries, and also for cosmetic and domestic uses." By omitting any plasticizers it is possible to produce a relatively-hard thick-layered composite. But to obtain desired high-strength casts, the foam would have to be loaded with so much substantially-non-compresible resin that the compressibility and conformability of the composite at elevated temperature is unduly sacrificed. As a consequence, if an attempt were made to form casts therefrom, overlapping adjacent layers would create intolerable internal ridges which not only are very uncomfortable to the patient but also can cause damage to the underlying flesh.

OBJECTS OF THE INVENTION

It is therefore a general object of the present invention to provide a thermoplastic supportive structure which avoids many of the disadvantages of prior art structures, particularly in the field of orthopedic applications. It is another general object to provide a composite thermoplastic supportive structure which avoids many of the shortcomings of plaster of Paris structures and plastic-based alternatives thereto.

It is a more specific object to provide a comfortable, lightweight, relatively strong, non-absorbent, washable orthopedic cast material which is not opaque to X-rays. It is another specific object to provide an orthopedic wrap which is easy to cut and shape and convenient and non-messy to handle, can be quickly prepared and applied, does not require water, catalysts or other extraneous reagents to activate, is free of any undue shrinkage upon heating and any exothermic reaction upon hardening and can be easily removed and, if desired, reused. It is another specific object to provide a composite orthopedic wrap which has controlled stretch, is highly compressible and comformable to the underlying limb and is characterized by a smooth inner surface without substantial internal ridging even where overlapped. It is another specific object to provide a composite wrap which lends itself to fabrication in substantial thicknesses whereby strong supportive structures with relatively smooth surfaces can be prepared with relatively few overlapped layers.

It is still another specific object to provide an orthopedic wrap and bandadge or sheet form which has a long shelf life and good aging properties, lends itself to perforation to achieve desired moisture vapor transmission or breathability, has a controllable rate of hardening and maintains its strength at ordinary temperatures up to about 120° F. It is still a further specific object to provide a cast material which, in certain embodiments, can be readily reinforced by the convenient application of strengthening strips or ribs thereto.

These and other objects of the present invention will become apparent as the detailed description proceeds.

SUMMARY OF THE INVENTION

These objects are achieved by a composite supportive structure comprising a web of resilient, open-cell, non-thermoplastic foam impregnated substantially throughout with a matrix of foam-like thermoplastic material which is cohesive and readily moldable at elevated temperatures, i.e., above about 120° F., preferably above about 140° F., and crystallizable into a substantially hard, rigid structure at temperatures below about these temperatures. The web of non-thermoplastic foam preferably has a pore count in the range of about 10 to 120 pores per linear inch and a thickness of about $\frac{1}{32}$ to $\frac{1}{4}$ inch, although for specialized applications thinner or thicker cross sections can be employed. To retain the compressibility and resiliency of the foam after impregnation and at elevated temperature, the foam-like thermoplastic impregnant should have a void volume of at least 20% and preferably above about 25%, e.g., about 30% or more.

The composite supportive structure may be in the form of a sheet or elongated bandage which, for orthopedic applications, can be heated and spirally wound back and forth in overlapping relationship to form, upon cooling and crystallization, an immobilizing cast. In a preferred embodiment the composite is preforated to enchance breathability. By packaging the composite in an airtight and opaque container, e.g., aluminum foil, it has almost indefinite shelf life. Further details as to the resilient, non-thermoplastic foam, the foam-like thermoplastic impregnant, and related matters are set forth in the following subsections.

THE OPEN-CELL, RESILIENT NON-THERMOPLASTIC FOAM

The open-cell, resilient foam employed in the practice of the present invention may be any of several available highly stretchable and compressible non-thermoplastic foams, including polyurethane, urea-formaldehyde, rubber-based, and possibly certain vinyl and acrylic foams and functional equivalents thereof, which meet the several requirements hereinafter set forth. Manifestly, the foam must have a highly porous, open cellular structure to receive the thermoplastic impregnant throughout and in sufficient quantity and foam-like form to provide the requisite structure strength to the composite. It must itself be non-thermoplastic so that the integrity of the composite, which it supports, is maintained even at elevated temperatures, whereby excessive thinning out, narrowing and pull apart are avoided.

More specifically, the non-thermoplastic foam should also be resilient enough to expand to its original uncompressed size after impregnation, this requirement arising from the fact that the foam may be slightly compressed during the impregnation step. It should have sufficient body to prevent undue shrinkage of the thermoplastic material contained therein and to maintain the foam-like character thereof, particularly if inadvertently compressed while in a highly plastic or moldable state. The non-thermoplastic foam otherwise insures the porosity and breathability of the composite by maintaining the integrity of any perforations formed therein, patricularly when being handled or applied in the heated or plastic state.

Of equal importance, the non-thermoplastic foam should have sufficient elasticity to provide sufficient but limited stretch to the heated composite and a controlled amount of back-pull whereby the heated composite can be applied to irregularly-shaped body portions and conform well thereto without excessive constriction forces which might produce a "tourniquet effect." The foam should be soft enough so as not to be harsh to the feel and to permit overlapping of the composite without pronounced ridging.

Since the foam by and large controls the size of the composite and the amount of thermoplastic impregnant present, it should desirably be thick enough to produce, when the product is used in bandage form, a supportive structure of desired bulk with as few overlapping layers as possible, e.g., about three or four layers. The thickness should not be so great, however, as to create production problems, including difficulties associated with forcing the impregnant throughout the foam and driving off any solvent contained therein. In this connection it should be noted that the voids formed within the impregnant polymer are contained within the body of the foam and accordingly the foam sheet used should be of sufficient thickness to contain such voids. By the same token, the foam should not be so thin as to cool too rapidly during application, whereby adjacent layers prematurely lose cohesiveness and do not bond to one another.

In the preferred embodiment, the foam may be either a polyester or polyether polyurethane foam, typically having a density in the range of about 1 to 6 pounds per cubic foot and a cell density or pore count in the range of about 10 to 120 cells or pores per running inch (abbreviated "p.p.i."), preferably about 50 to 100 p.p.i. Polyester polyurethane foams are preferred because cell size may be more readily controlled and because of their superior tensile strength characteristics. A typical polyester polyurethane foam may be prepared, for example, as set forth in Example II of U.S. Pat. 2,956,310.

Polyurethane foams having at least about 50 p.s.i. are preferred for cast bandages because those in the lower pore count range have a generally harsh feel and do not have as desirable stretch properties, e.g., excessive tension to stretch and too much return power. In addition, such low pore count foams are difficult to slice to thicknesses of less than about $\frac{1}{8}$ inch on a high-speed production basis.

Above about 120 p.p.i., the pores are so fine that difficulty in impregnating the same with the thermoplastic material and foaming the impregnant may be experienced. Moreover, even if successfully impregnated, the amount of thermoplastic material may be insufficient to obtain the desired properties in the finished cast.

While completely open-cellular foams are preferred, such as those known in the trade as "reticular" foams where the cell walls have been removed by chemical or mechanical treatment, foams having open-cellular structures of about 50% open cells or more may also be successfully employed. The partially reticulated and non-reticulated foams are generally somewhat less in cost and may be used where a cost saving is desired, although the fully reticulated foams are preferred.

Because of the cell walls present in the non-reticulated and partially reticulated foams, the preferred pore sizes may be somewhat larger than in the case of fully reticulated foams. For example, in a particular embodiment using identical masses, about 80 p.p.i. may be optimal in the case of a fully reticulated foam, whereas about 60 p.p.i. may be optimal for a partially reticulated or non-reticulated foam. Such foams are commercially available, e.g., 80 p.p.i. Scott reticulated foam as sold by the Foam Division, Scott Paper Company, Chester, Pa., and 60–65 p.p.i. substantially non-reticulated P4104 Foam as sold by the General Foam Division, Tenneco Chemicals, Inc., New York, N.Y.

Because, as aforementioned, good conformability upon heating of the composite is a prerequisite for many applications and conformability is usually enhanced if the product is stretched slightly when applied, the non-thermoplastic foam should have an extent of elasticity such that it can be stretched in any direction at least about 10% beyond its original dimension and return upon release and preferably about 65 to 70% beyond its original dimension. The ultimate elongation before rupture is typically substantially greater, e.g., about 100 to 400%, or two to five times its original dimension.

To assure that the product can be stretched without requiring excessive forces, the 100% modulus (the force per unit width required to stretch the product 100% beyond its original dimension) should preferably be no greater than about 5 pounds per inch width, optimally less than about 3.0 pounds, e.g., 0.5 to 2.5 pounds per inch width. The 100% modulus is, of course, related to thickness.

The preferred thickness of the polyurethane depends upon its ultimate use, but for orthopedic purposes is in the range of about 1/32 to 1/4 inch, e.g., about 1/16 inch. As aforementioned, the thickness must not be such as would create production problems.

Thinner foams than above indicated may also be used if a reinforcing coating or impregnant for the polyurethane foam is employed and assuming that the resulting thinner composite does not cool too rapidly and lose its layer-to-layer cohesiveness during application. Suitable strengthening impregnants include acrylic latex binders, thermoplastic polyurethane used in emulsion or solution form such as Estane (thermoplastic polyurethanes for solution application) sold by B. F. Goodrich Chemical Co., ionomer resin dispersions such as described in U.S. Pat. 3,322,734 and sold by E. I. du Pont de Nemours & Company, Inc. under the trade name Surlyn D1230, and Adiprene Urethane Rubber (the reaction product of a diisocyanate and a polyalkylene ether glycol), also sold by Du Pont.

Such strengthening materials may also be added to thicker foams, particularly if they are to be employed for prosthetic applications. The suitability of other impregnants, including their effect upon layer-to-layer cohesiveness, can readily be determined by those skilled in the art. The impregnants may be added by conventional techniques, including padding, gravure roll, and the like.

THERMOPLASTIC IMPREGNANT

Thermoplastics employed in the composite of the present invention include synthetic and natural trans-1,4-polyisoprene, certain polychloroprenes, certain polycaprolactones, as well as equivalents thereof, which meet the requirements hereinafter set forth. As previously indicated, the thermolastic impregnant must be moldable at moderate elevated temperatures, i.e., above about 120° F., preferably above about 140° F. and crystalline and substantially hard and rigid at temperatures substantially below such levels. They should also have the property of adhering to themselves, after heating to the amorphous or non-crystalline state and preferably continuing to be tacky and self-adhesive for a brief period of time even after cooling to temperatures as low as 80° F. For orthopedic applications the transition temperature between the hard rigid state and the soft moldable state should be above the normal maximum temperatures encountered wherever the cast is to be worn.

A transition temperature of about 120° F. would be satisfactory for all but a few isolated places in the world. Actually, the transition temperature may cover a substantial range, e.g., 5° F. or more. Thus, for example, the impregnant may gradually soften as the temperature is raised through the range of about 115° F. to 120° F.

Another requirement is that the thermoplastic impregnant should remain soft and pliable for a sufficiently long period of time after heating to permit formation of the supportive structure or cast, and preferably there should be a slight time lag between return to room temperature and complete crystallization. For orthopedic purposes, a period in the range of about 2 to 15 minutes, preferably 3 to 10 minutes, is satisfactory. The time period is preferably controllable by, for example, applying external cooling and the like. This controllability may be enhanced by perforating the composite, as more fully described hereinafter. Once the material is applied, it is desirable to have it harden as rapidly as possible and to retain the resultant rigidity.

The impregnant in the softened state should have good cohesive properties so that the multilayered cast formed therefrom forms a substantially integral supportive structure. The cohesive bond formed in the softened state should, of course, be retained after the material cools and crystallizes.

An essential characteristic of the impregnant after impregnation and drying is that it has voids formed therein which render the impregnant and thus the composite, when heated, highly compressible and conformable, with the result that orthopedic wraps can be formed that are substantially free from ridges at overlapping areas, particularly on the internal or skin-side surface thereof. To achieve these essential characteristics, the total volume of voids in the impregnant after the composition is formed, as aforementioned, should be at least about 20% of the volume of thermoplastic material and preferably in excess of 25%. In magnified cross section the voids give the composite an appearance similar to "Swiss cheese."

For orthopedic applications, the material manifestly should be safe to use against the skin. It should also be hypo-allergenic and, preferably, non-allergenic. It should not absorb body fluids and should be pervious to X-rays so that X-ray pictures of the encased limb can be taken without removing the cast. But even if removal becomes necessary for other reasons, e.g., medication, removal of stitches, inspection of a wound site, etc., the cast of the present invention has the advantage of being readily removable and reusable and can then be reapplied because of its thermoplastic nature and its ability to bond to itself after again being heated. As previously indicated, thermoplastic resins meeting the above requirements include synthetic as well as natural trans-1,4-polyisoprene, certain polychloroprenes and high molecular weight polycaprolactones, and equivalents thereof. Many of these polymers are characterized by being crystalline at room temperature, being non-crystalline at elevated temperatures and having a relatively rapid rate of crystallization when cooled to room temperature or below. All have the property of being moldable and cohesive at temperatures in the order of about 160 to 180° F. while reverting to a relatively rigid form after cooling to room temperature or below, room temperature generally being considered to be in the range of about 60 to 70° F. The preferred polymers have a delayed hardening time after being cooled to room temperature. The hardening time of the polymer may be modified by compounding with additive fillers. This permits sufficient time for a supportive structure or multi-layered cast to be formed while the polymer is still pliable.

Among suitable polymers is synthetic trans-1,4-polyisoprene, which is described, for example, in the aforementioned British Pat. 1,155,556. It is crystalline at room temperature and produces a characteristic X-ray diffraction pattern. The polymer should be at least 10% crystalline as determined by X-ray methods at room temperature. The upper limit of crystallinity is not critical, although it is not practical to use polymers higher than 60% crystalline. For best results, a crystallinity of about 20 to 40% is preferred. The polyisoprene should have at least 85% of the isoprene units in the trans-1,4 configuration.

The synthetic crystalline trans-1,4-polyisoprene may be prepared by polymerizing isoprene in a hydrocarbon or halo-hydrocarbon diluent in the presence of stereo-specific Ziegler type catalysts. The synthetic crystalline trans-1,4-polyisoprene can also be used in blends with other polymeric materials, although a major proportion, i.e., about 50% or more, preferably 60% or more, of the blend should be the trans-1,4-polyisoprene. For example, 100 parts by weight of trans-1,4-polyisoprene can be blended with up to 50 parts by weight of synthetic styrene-butadiene copolymer or acrylonitrile butadiene copolymer without adversely affecting the useful properties of the trans-1,4-polyisoprene. Still other ingredients, e.g., antioxidants, may be added to achieve desired properties, as will be set forth in subsequent portions of the description and examples and as will be apparent to those skilled in the art in the light of this disclosure.

Fillers may also be added, e.g., up to about 100 parts by weight of fibrous or powdery fillers such as silica, calcium carbonate, aluminum silicate, zinc oxide, per 100 parts by weight of trans-1,4-polyisoprene, preferably about 5 to about 50 parts by weight per 100 parts by weight of the trans-1,4-polyisoprene. Carbon blacks may also be used in similar amounts if a non-white structure is desired. A compatible, preferably non-allergenic tackifying resin such as the polyterpenes, coumarone-indene resins, epoxy resins, natural wood resins, may be added if desired to improve processability and bonding of the polymeric composition to itself during application to the body. Fillers, resins and coloring agents are preferably selected from those compounds which transmit X-rays.

Sources of natural trans-1,4-polyisoprene which may be employed are balata, gutta percha and related gums. Preferably, purified grades are used, that is, those in which the resins have been partially or completely removed. With any of these materials the criteria of crystallinity should be met as set forth above. Consequently, it may be necessary in some instances to remove the impurities which affect the crystallization. Also, the removal of some of the more sticky resins from some of these naturally-occurring gums makes them more readily adaptable for orthopedic use.

Polymers of chloroprene which may also be employed include those prepared at both lower and higher temperatures. Polymers of chloroprene prepared at lower temperatures, e.g., below about 70° F., crystallize more rapidly than polymers prepared at higher temperatures. For example, Maynard et al., "Journal of Polymer Science," 18, 227–34 (1955) and Walker et al., Proceedings of the Second Rubber Technology Conference, London, 1948, 69–78, disclose the preparation of polymers of chloroprene at low temperatures.

The preparation of suitable chloroprene polymers is also disclosed in U.S. Pats. 2,417,034, 2,426,854 and 2,567,117. Polymerization is normally carried out using the conventional redox initiation system well known to those skilled in the art of polymerization. Although homopolymers of chloroprene are preferred, the polymer may contain a minor amount of another copolymerizable monomer. Such monomers include styrene, 1,3-butadiene, isoprene, 2,3-dichloro-1,3-butadiene, acrylic and methacrylic acids and esters and nitriles. Commercially-available forms of suitable polychloroprene include Neoprene HC (E. I. du Pont de Nemours & Company, Inc.), which it about 97% trans-1,4-polychloroprene.

The polycaprolactone polymers which have been found suitable for the practice of the present invention are the high molecular weight polycaprolactones. These polycaprolactone resins can be represented by the structure

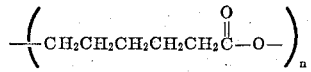

where $n$ can vary from about 100 to 1,000, depending on the particular molecular weight grade. Examples of such high molecular weight polycaprolactone polymers that are presently commercially available are PCL–300 and PCL–700 as available from Plastics Division, Union Carbide Corporation, Bound Brook, N.J. The reduced viscosities of PCL–300 and PCL–700 (0.2 g./dl. in benzene at 30° C.) are respectively, 0.3 and 0.7 and correspond approximately to weight average molecular weights of 15,000 and 40,000. Further information is provided in Union Carbide's technical data bulletin entitled "New Polycaprolactone Thermoplastic Polymers PCL–300 and PCL–700."

While trans-1,4-polyisoprene, polychloroprenes and polycaprolactones are usually employed individually as the basic constituent of the foam-like thermoplastic material in the composite, combinations thereof in the form of overcoatings or mixtures may also be employed to obtain desirable properties of each. For example, mixtures of trans-1,4-polyisoprene and polychloroprene may be prepared and put into solution as the impregnating medium for polyurethane foam. The trans-1,4-polyisoprene gives a stronger, harder and more rigid cast, whereas the polychloroprene is less costly at present. Mixing the two results in a composite having properties intermediate the two at a cost which is less than if only trans-1,4-polyisoprene were employed.

As another example, polycaprolactone has a slightly brittle feel to it, although it is otherwise satisfactory as the thermoplastic material in the composite. The slightly brittle characteristic can be masked, however, by first impregnating the inside of the non-thermoplastic foam with the polycaprolactone and then overcoating with trans-1,4-polyisoprene or polychloroprene.

AMOUNT OF THERMOPLASTIC IMPREGNANT

The amount of foam-like thermoplastic material in the composite depends upon a number of variables, including, for example, the thickness of the non-thermoplastic foam, the pore volume thereof, the void volume of the thermoplastic material itself, and the particular type of thermoplastic material. For example, when using identical foams and having the same void volume in the thermoplastic impregnant, the weight of polychloroprene would be greater than that of polyisoprene because of the higher specific gravity for the former.

Experience indicates that in the case of orthopedic bandages and sheets and when employing 80 p.p.i. Scott reticulated polyurethane foam having a thickness of 1/16 inch, the amount of trans-1,4-polyisoprene impregnant in a satisfactory product is in the range of about 0.3 to 0.8 gram per square inch. This range applies to composites which are non-perforated. The weight of thermoplastic impregnant greatly exceeds the weight of the non-thermoplastic foam. For example, when employing about .5 gram of trans-1,4-polyisoprene per square inch of the composite, the impregnant makes up about 97% of the total weight of the composite.

OBTAINING THE FOAM-LIKE STRUCTURE

As above indicated, it is essential that the thermoplastic component of the composite have a foam-like structure so that the composite is highly compressible when heated. To impart the foam-like structure to the thermoplastic component a preferred technique is to impregnate the non-thermoplastic foam with a low-solids solution of the thermoplastic component in xylene, toluene, or the like and combinations thereof. The solvent is then driven off by subjecting the impregnated foam to drying conditions, as will be apparent from the description of the drawings and the specific examples. In driving the solvent off, it acts in effect as a blowing agent, imparting the desired foam-like structure to the polymer, resulting in the desired thermoplastic foam within a non-thermoplastic foam.

The method of preparation is not, however, limited to this technique. Another possible approach is to prepare the impregnant as a water dispersion. For example, balata and gutta percha are in water dispersion (latex) form in their natural form. Where relatively pure and in laxtex form, they may be impregnated into the non-thermoplastic foam without having to dissolve them in a solvent. The drying conditions must be such as to drive off the water in such manner as to impart the foam-like structure.

Similarly, trans-1,4-polychloroprene is synthesized in the form of a latex. Where available in such form, it too need not be dissolved in a solvent but may be added to non-thermoplastic foam and the water rapidly driven off to obtain the foam-like thermoplastic structure within.

PACKAGING AND OTHER TECHNIQUES FOR ENHANCED SHELF LIFE

Because the cohesive properties of trans-1,4-polyisoprene, trans-1,4-polychloroprene, balata, gutta percha, and polycaprolactone to a very much lesser extent, may deteriorate when exposed to air for prolonged periods, the composites formed therefrom in accordance with the present invention are preferably packaged in airtight and preferably air-exhausted containers. Because these thermoplastic materials are also somewhat sensitive to light, particularly trans-1,4-polychloroprene, the containers should preferably be opaque.

In a particular embodiment, the composite is sealed in aluminum foil packages which are inexpensive and may be readily opened or torn open for use. If only a portion of the composite is used, the remainder may be substantially resealed in the aluminum foil by overloading the edges of the foil. As another alternative, the composite, particularly if fabricated in roll form, may be stored in an air-impermeable cylindrical container made of impregnated cardboard opaque plastic or the like, with a sealable, screw-on top. Various alternative containers may also be employed, as those skilled in the art will readily recognize.

Shelf life, including sustained cohesive properties, may also be enhanced by the addition of antioxidants and similar stabilizers. For example, the shelf life of a composite including trans-1,4-polyisoprene may be materially increased by the addition of about 0.05 to 1.0 wt. percent, based on the polyisoprene, of Plastanox 2246 (2,2'-methylene-bis(4-methyl-6-tertiarybutyl phenol) sold by American Cyanamid Company, Organic Chemicals Division, Bound Brook, N.J.), Ionol Antioxidant (2,6-di-t-butyl-4-methyl phenol sold by Shell Chemical Company, Cleveland, Ohio), or similar compatible antioxidant.

Still another technique for increasing shelf life is to pre-extract the trans-1,4-polyisoprene with acetone. The acetone extraction removes very-low molecular weight polymeric and other possibly contaminating materials, which appear as oily and waxy components in the extract. While retention of cohesive properties for longer periods of time results, the addition of an extraction step increases production time and cost. Because the unextracted impregnant already exhibits satisfactory aging properties, the extraction step may be justifiable only under demanding circumstances.

PARTICULAR EMBODIMENTS

A particular embodiment of the composite of the present invention employed as an orthopedic wrap is prepared by perforating the same after impregnation to increase the breathability thereof and minimize undesired maceration of the underlying skin. For example, a $\frac{1}{16}$-inch thick orthopedic wrap of the present invention may be perforated with a pattern of $\frac{3}{32}$-inch diameter holes on a $\frac{1}{4}$-inch diagonal spacing. Perforation also exposes more area of the composite, and thus increases sensitivity, to ambient conditions. This facilitates the heating and cooling of the composite and makes it more responsive to rapid adjustments therein.

In another particular embodiment of the present invention, the cast formed from crystallization of the foamed polymer in the overwrapped composite may be further strengthened by securing to the external surface thereof reinforcing ribs or layers of non-foamed polymer. By using the same or similar polymer for the reinforcing rib as in the composite structure, the rib can be readily "welded" thereto simply by pressing it against the external surface of the composite and molding it thereagainst while both are in the non-crystallized or moldable state.

In a still further embodiment of the present invention, the product is prepared in roll form with an interlining, such as conventional silicone-coated paper, and accumulated on a cylindrical spool which may be fabricated from cardboard, plastics, metal and the like and combinations thereof. In a preferred embodiment the spool has sidewalls, as will be described in connection with the accompanying drawing, and the spool with its sidewalls is fabricated from metal, e.g., sheet steel, aluminum, etc.

The metal spool helps to transfer heat to the rolled and interlined composite, thus decreasing heating time and enhancing evenness of heating. The metal also serves as a "sink" to keep the roll hot, and for such purposes the spool may be fabricated with a heavier shaft than required by structural strength considerations. The shaft preferably has a hollow center to allow passage therethrough of hot air so as to facilitate rapid heating of the shaft along its entire length and thus heating of the inner portions of the bandage.

The preferred embodiment with metal sidewalls has the disadvantage of normally being too hot to handle with bare hands, particularly when first removed from the heating zone or oven. The wearing of protective gloves to avoid burns or discomfort presents its own problems, e.g., occasional unavailability, added expense, decrease in grip and "feel" (a vital consideration to the doctor), inconvenience and the like. The preferred solution is to apply a layer of insulation to at least the hand-contactable portions of the metal spool, e.g., peripheral edges and outer surfaces of the sidewalls.

The insulation may, for example, take the form of a layer of foam covering the hand-contactable surfaces. The foam may be, for example, any of those already referred to herein as suitable for the web of the composite product, preferably polyurethane foam. Other materials may also be used such as flannel or other thicker cloths. As another alternative, a heavy layer of flock or even a layer of foam particles may be adhered to the metal surface by first applying an adhesive coating such as a rubber cement.

The effectiveness of the thermal insulation has been established by heating to 220–230° F. in an oven a spool of tape, the spool having been fabricated from sheet steel and having the sidewalls and peripheral edges thereof covered with $\frac{1}{8}$ inch thick, 100 p.p.i., Scott reticulated polyurethane foam. The dispenser spool was removed from the oven with bare hands and handled in the usual manner without any discomfort. Another advantage of insulating at least the hand-contactable surfaces is that the insulation reduces the heat loss from the spool and its tape contents. The foam-covered spool is also easier to hold onto than plain metal spools.

BRIEF DESCRIPTION OF THE DRAWINGS

The present invention will be more clearly understood from the following detailed description of specific embodiments, read in conjunction with the accompanying drawings, wherein:

FIG. 1 illustrates in magnified and fragmentary cross section a web of compressible, open-cell foam prior to impregnation thereof;

FIG. 2 is similar to FIG. 1 and illustrates in magnified and fragmentary cross section the "Swiss cheese" appearance of the resulting impregnated and dried composite;

FIG. 3 illustrates the composite of the present invention in roll form with an interliner, said composite being accumulated on a metal spool with insulated sidewalls;

FIG. 4 schematically illustrates one method of producing the composite of the present invention;

FIG. 5 illustrates one technique for packaging the composite to obtain enhanced shelf life, i.e., in an airtight, opaque, flexible wrap;

FIG. 6 illustrates a human forearm immobilized by a cast formed from the composite of the present invention; and FIG. 7 is a magnified and fragmentary cross section of two overlapped adjacent layers of the composite of the present invention and illustrates how the features of compressibility and conformability result in smooth surfaces which are free of undesired ridging.

It should be understood that the subject matter is illustrated and represented in the drawings by convenient graphic symbols and the like and that the drawings are not necessarily to scale. As a result, the representations may depart from actual appearances of the various structures.

DETAILED DESCRIPTION OF THE DRAWINGS INCLUDING PREFERRED EMBODIMENT

Referring to FIG. 1, the composite is formed from a web 10 of non-thermoplastic, resilient foam such as open-cell polyurethane foam, the cellular structure thereof being represented by cell walls 12. In a specific embodiment, web 10 has a thickness of about 1/32 to 1/4 inch, e.g., 1/16 inch, and a cell density or pore count in the range of about 10 to 120 p.p.i., preferably 50 to 100 p.p.i.

Referring to FIG. 2, the composite supportive structure 14 of the present invention is formed from web 10 by incorporating therein a matrix of foam-like thermoplastic material such as trans-1,4-polyisoprene which has a void volume of at least about 20% of the thermoplastic material. In cross section the composite has the appearance of "Swiss cheese," the "cheese" in FIG. 2 being represented at 16 and the multiplicity of irregular voids or holes being represented at 18. Because of the presence of the foam-like thermoplastic material, the cell walls 12, which are clearly visible in FIG. 1 prior to impregnation, are not readily apparent after impregnation, as illustrated in FIG. 2.

As aforementioned, for orthopedic purposes the composite 14 of the present invention is preferably perforated so as to enhance breathability, etc., and prepared in roll form for convenience in handling and use. Thus, referring to FIG. 3, composite 14 is perforated to form a regular pattern of apertures 20, e.g., 3/32-inch holes on a 1/4-inch diagonal spacing, and rolled up on a sheet steel spool comprising hollow cylindrical shaft 22 having sidewalls 24 and 26 secured thereto. In a preferred embodiment, sidewalls 24 and 26 have a layer of insulation adhered thereto. e.g., 1/8 inch thick, 100 p.p.i., Scott reticulated foam, by means of double-faced pressure-sensitive adhesive tape.

Because of the cohesive nature of composite 14 at elevated temperature, an interliner 28 is provided between each layer of the rolled-up composite. This inner layer may comprise a strip of conventional release interlining material such as silicone-coated paper.

Referring to FIG. 4, the composite is produced from a supply roll of open-cell polyurethane foam 30 of desired width, which is fed around direction-changing roller 32 where it joins with supportive carrier sheet 34, e.g., a continuous fabric-reinforced rubber belt preferably coated with a release agent. Carrier sheet 34 is driven around direction-changing rollers, 32, 36, 38 and 40 by conventional drive means (not shown) and supports the elongated web of polyurethane foam during the impregnation, drying and cooling steps. Carrier sheet 34 is preferably perforated to permit rapid drying of the impregnated foam, e.g., 1/4-inch holes on a 3/8-inch diagonal spacing.

From supply source 42, a 20% solids dispersion in xylene of trans-1,4-polyisoprene compounded with filler, pigment and antioxidant is applied by means of transverse nozzle applicator 44 to the moving web. The dispersion penetrates into the web because of the open cellular structure of the web and fluid nature of the impregnating composition. Metering of the impregnant is accomplished by passing the web between knife blade 46, having "ears" 48 at each extremity thereof, and rotating backup steel roll 50.

The impregnated web 52, still supported on carrier sheet 34, then enters a ventilated drying oven 54 wherein the sheet is heated to progressively higher temperatures, e.g., in the range of about 200 to 350° F., for a sufficient period to drive off the solvent. The drying operation produces a series of voids in the composite structure, such as illustrated by voids 18 in FIG. 2. The impregnation and drying steps may be repeated one or more times, if necessary, to achieve the desired concentration of thermoplastic foam within the composite structure, as indicated by break 56. The sheet is then cooled by passing through cooling chamber 58.

The dried and cooled composite 60 then passes into perforation zone 62 wherein the desired pattern of perforations is produced, as aforementioned. The perforated composite 64 is then collected as product roll 66 in desired lengths, which then pass to the packaging zone 68. Optionally, an interliner sheet 70, e.g., silicone-coated paper, from a supply roll 72 thereof may be interleaved as the composite 64 is collected on roll 66.

In packaging zone 68, the perforated composite wrap may be packaged in desired form, e.g., in unsupported roll form or on a spool, as already depicted in FIG. 3, or the like, preferably with an interliner. The spool or roll of composite should be packaged in an airtight, preferably opaque, container such as a cylindrical plastic vessel with a sealable screw-on top, an air-impervious plastic film bag, or a metal foil wrapper as suggested in FIG. 5.

In FIG. 5, a roll of perforated composite 74 is sealed in an over-wrap of metal foil 76, e.g., aluminum foil, the side and end edges of which are sealed by folding them together as suggested by rolled-together edges 78. The composite may be removed by unrolling the edges 78 or tearing open foil 76. If only a portion of the wrap is to be used, it may be resealed in the package by again rolling or folding the edges together.

In a particular embodiment, a cast formed from the perforated wrap of the present invention may be reinforced by strips of non-foam-like thermoplastic material of desired thickness as dictated by strength requirements. Referring to FIG. 6, a human forearm is encased in a cast 80 produced by a plurality of layers of the perforated composite, e.g., 3 or 4 spirally-wound, overlapping layers. To increase the strength thereof, a rib or strip 82 (or a plurality of spaced strips) of non-foamy thermoplastic material, e.g., trans-1,4-polyisoprene, may be applied to cast 80 while both are still soft and moldable. The result is a reinforced cast which provides extra strength at critical areas without requiring that the entire cast have the same thickness. This enhances the lightweight, high-strength nature of the cast.

The highly advantageous features of compressibility and conformability are illustrated in FIG. 7. Two adjacent layers 84 and 86 of the composite of the present invention (such as may be encountered in cast 80 of FIG. 6) are overlapped as indicated at 88. The overlapped portions are cohered and compressed, resulting in substantially constant thickness and smooth exposed surfaces. This avoids irritating ridges and enhances conformability.

EXAMPLES

The present invention will be more clearly understood from the following specific examples.

Example 1

An orthopedic bandage is prepared employing sheets of 1/16 inch thick, 80 p.p.i., Scott reticulated polyurethane foam and a 20% solids dispersion having the following composition:

| | Parts by weight |
|---|---|
| Trans-1,4-polyisoprene (Polymer Corporation XPRD-B-528) | 80.0 |
| Finely-divided precipitated hydrated silica (Pittsburgh Plate Glass Company Hi Sil 233) | 16.0 |
| Titanium dioxide pigment (Titanium Pigment Corcorporation Titanox ALO) | 4.0 |
| Ionol antioxidant (supra) | 0.8 |
| Xylene | 403.2 |

This dispersion is applied to and driven into the foam sheet using a spatula. The impregnated foam sheet is then heated for 10 minutes in a steam cabinet at 160° F. and then dried at 240° F. for 3 to 5 minutes. A second impregnation, using the same procedure, is carried out so that the foam is impregnated throughout the extent desired.

The resulting structure contains about .5 gram of the dried impregnation per square inch of composite. When viewed in section at a magnification of about 14 times, the composite has a foamy like appearance, that is, it is characterized by a series of voids suggesting the appearance of "Swiss cheese." When heated substantially above about 120° F., e.g., about 180° F., it is readily compressible and readily moldable. When spirally wrapped into an overlapping multilayered structure, it forms a smooth cast which becomes substantially hard and rigid at room temperature.

For comparison and in order to evaluate both the product and the process of U.S. Pat. 3,061,460 with respect to the preparation of orthopedic materials, several other examples were prepared using the same polyurethane as employed in Example 1. In the preparation of one sample, the process of U.S. Pat. 3.061,460 was used in doing the impregnation but the impregnant was the composition above described. In another sample the foam was impregnated by the above-described process rather than that of U.S. Pat. 3,061,460, but the impregnant used was a polyvinyl chloride having the property of being relatively hard and stiff at normal room temperatures but softening when heated to about 120° F.

Where the process of U.S. Pat. 3,061,460 was used, the resulting product had insufficient strength to permit its satisfactory use as material for forming a leg or arm cast. Also, it had no adherence to itself when applied as a bandage wrap in preparing a cast. Where the process of the present invention is employed but the impregnant used is polyvinyl chloride, the resulting product when viewed in cross section at a magnification of about 14 times, exhibits only very small bubbles, lacks the desired foamy structure, lacks the requisite compressibility, lacks the necessary cohesive properties, and is otherwise deficient as an orthopedic bandage or sheet.

Example 2

An orthopedic bandage is prepared from 1/16 inch thick, 80 p.p.i., Scott reticulated polyurethane foam which is impregnated with a 20% solids solution having the following composition:

| | Grams |
|---|---|
| Trans-1,4-polyisoprene | 800 |
| Hi Sil 233 (supra) | 800 |
| Titanox ALO (supra) | 40 |
| Ionol antioxidant (supra) | 8 |
| Xylene | 4032 |

Before adding the Ionol antioxidant, the other three solid ingredients are broken down in a Banbury mixer for about 16-18 minutes. This "breakdown" cycle reduces the viscosity of the solution formed therefrom whereby its impregnation characteristics are improved. For example, without the "breakdown" cycle, the viscosity of a 20% solids solution at 70° F. is found to be about 68,000-70,000 centipoises. With the "breakdown" cycle, the viscosity of a 20% solids solution at 70° F. is about 25,000-28,000 centipoises.

After adding the antioxidant and forming the 20% solids solution, the solution is forced throughout the polyurethane foam by means of a spatula. After drying, the resultant composite is found to have about .5 gram of the impregnant per square inch of composite. When heated to elevated temperature, e.g., substantially above about 120° F., it is highly compressible, conformable, and cohesive. When formed into a multilayered cast and cooled, the cast is found to be substantially hard and rigid and has substantially smooth outer and inner surfaces which are free of undesired ridging.

Example 3

An orthopedic sheet is formed by impregnating 1/16 inch thick, 80 p.p.i., Scott reticulated polyurethane foam using the following composition:

| | Parts by weight |
|---|---|
| Neoprene HC (supra) | 79 |
| Magnesium oxide | 2 |
| 2,6-di-tert-butyl-4-methyl phenol antioxidant | 1 |
| Titanium dioxide | 6 |
| Magnesium silicate | 12 |
| Toluene | 344 |

As in Example 2, the solid components without the antioxidant are broken down in a Banbury mixer until thoroughly mixed. After adding the antioxidant, forming the solution in toluene, impregnating the foam and drying, the composite is characterized by a foam-like structure similar to that portrayed in FIG. 2. The resultant polychloroprene bandage material is made into a finger cast, which takes slightly longer to harden and is slightly softer and less rigid than the polyisoprene casts prepared as described in Examples 1 and 2. There is presently some speculation that such less rigid casts may actually be more desirable for certain orthopedic purposes.

Example 4

A bandage is prepared substantially as described in Example 3 except that after drying both surfaces are additionally coated with an impregnating solution prepared substantially as described in Example 1. After again drying, the resultant sheet material is evaluated for cast usage.

The outer layer of trans-1,4-polyisoprene layer appears to bond quite well to the inner polychloroprene layer. When made into a finger cast, the cast appears to have the characteristics intermediate the two cast materials.

Example 5

A 25% solids solution-dispersion was prepared by dissolving in xylene PXCL 4926 (substantially a mixture of polycaprolactone polymers PCL-300 and PCL-700 above identified) obtained from Union Carbide Corporation. Moderate heating and stirring were used to accomplish this.

Scott reticulated foam at 80 p.p.i. and 1/16 inch thickness was impregnated with this solution-dispersion. This was done by uniformly spreading the material on and then driving it into the foam with a spatula. The impregnated foam was dried in the steam cabinet (160° F.) for 10 minutes and then heated at about 250° F. for 2-3 minutes. After this initial impregnation each surface was recoated and dried using a similar coating and drying procedure.

The resulting foam-within-a-foam sheet was heated (165°-170° F. for about 5 minutes) and then wrapped around a human hand which had previously been covered with orthopedic stockinet. It was found that the sheet was moderately tacky to the touch when hot, and did stick slightly to the double face silicone-coated paper sheet on which it was heated. However, it did conform well to the human hand and, after cooling, formed a good rigid cast.

From the above description, drawings and examples, it is apparent that the objects of the present invention have been achieved. While only certain embodiments have been described or illustrated, many alternative modifications and equivalents will be apparent from the above description to those skilled in the art. These and other alternatives and equivalents are considered within the spirit and scope of the present invention and coverage thereof is intended by the claims of any patents based on this application and any continuations or divisions thereof, even though not necessarily encompassed by the strict verbiage thereof.

Having described the invention, what is claimed is:

1. A composite supportive structure comprising:
   (a) a web of compressible, open-cell, organic non-thermoplastic resilient foam having a thickness in the range of about 1/32 to 1/4 inch and a pore count in the range of about 10 to 120 pores per linear inch; and
   (b) a matrix of foam-like organic thermoplastic material having a void volume of at least about 20% of the thermoplastic material and sufficient plasticity and cohesiveness after being heated at elevated temperatures to be readily moldable, and having a crystallinity at room temperature of at least 10% so as to be crystallizable into a structure at ordinary ambient temperature having sufficient rigidity to immobilize and support a limb, said matrix being present in sufficient quantity and distributed substantially throughout the cellular structure of said web so as to substantially impart its moldability and rigidity characteristics to the composite.

2. The composite supportive structure of claim 1 wherein said foam comprises compressible, open-cell, resilient polyurethane foam.

3. The composite supportive structure of claim 1 wherein said thermoplastic material consists of at least a major proportion of trans-1,4-polyisoprene.

4. The composite supportive structure of claim 1 wherein said thermoplastic material comprises at least a major proportion of balata.

5. The composite supportive structure of claim 1 wherein said thermoplastic material comprises at least a major proportion of gutta percha.

6. The composite supportive structure of claim 1 wherein said thermoplastic material comprises at least a major proportion of polychloroprene.

7. The composite supportive structure of claim 1 wherein said thermoplastic material comprises at least a major proportion of polycaprolactone.

8. The composite supportive structure of claim 1 wherein the structure is perforated so as to enhance the breathability thereof.

9. The composite supportive structure of claim 1 in multilayered cohered relationship to form a rigid cast.

10. The composite supportive structure of claim 9, including an overlay of non-foamy thermoplastic material cohered to at least a portion of an external surface thereof to form a reinforcing layer.

References Cited

UNITED STATES PATENTS

| | | | |
|---|---|---|---|
| 2,805,208 | 9/1957 | Roche | 161—159 |
| 3,130,505 | 4/1964 | Markevitch | 161—159 |
| 3,314,425 | 4/1967 | Coppick | 161—159 |
| 3,393,119 | 7/1968 | Dugan | 117—98 |
| 3,464,872 | 9/1969 | Everett | 161—190 |

WILLIAM J. VAN BALEN, Primary Examiner

U.S. Cl. X.R.

161—159, 160, 165; 128—90; 117—98